United States Patent [19]

Morton et al.

[11] Patent Number: 5,025,480
[45] Date of Patent: Jun. 18, 1991

[54] BACKGROUND REFERENCING

[75] Inventors: Roger A. Morton, Penfield; Thomas J. Wetzel, Greece, both of N.Y.

[73] Assignee: Eastman Kodak Company, Rochester, N.Y.

[21] Appl. No.: 29,121

[22] Filed: Mar. 23, 1987

[51] Int. Cl.⁵ .............................................. G06K 9/38
[52] U.S. Cl. ....................................... 382/50; 382/51; 358/464; 358/465; 358/466
[58] Field of Search .................................. 382/50–54; 358/163, 166, 282, 284, 464, 465, 466

[56] References Cited

U.S. PATENT DOCUMENTS

| | | | |
|---|---|---|---|
| 4,032,977 | 6/1977 | Liao | 358/188 |
| 4,162,481 | 7/1979 | DuVall | 382/52 |
| 4,326,258 | 4/1982 | de la Guardia | 364/515 |
| 4,345,314 | 8/1982 | Melamud et al. | 382/51 |
| 4,395,697 | 7/1983 | Dargel et al. | 382/41 |
| 4,395,698 | 7/1983 | Sternberg | 382/27 |
| 4,395,699 | 7/1983 | Sternberg | 382/41 |
| 4,395,700 | 7/1983 | McCubbrey et al. | 382/27 |
| 4,414,685 | 11/1983 | Sternberg | 382/49 |
| 4,442,543 | 4/1984 | Sternberg et al. | 382/49 |
| 4,464,788 | 8/1984 | Sternberg et al. | 382/41 |
| 4,491,964 | 1/1985 | Sanner | 382/50 |
| 4,504,864 | 8/1985 | Anastassiou et al. | 358/167 |
| 4,525,747 | 6/1985 | Sakai et al. | 382/53 |
| 4,538,299 | 8/1985 | de Forest | 382/21 |
| 4,554,593 | 11/1985 | Fox et al. | 358/282 |
| 4,575,768 | 3/1986 | Sakai et al. | 358/282 |
| 4,578,715 | 3/1986 | Yamaguchi | 358/282 |
| 4,593,325 | 6/1986 | Kannapell et al. | 382/50 |
| 4,618,937 | 10/1986 | Elias et al. | 364/518 |

OTHER PUBLICATIONS

IBM Technical Disclosure Bulletin vol. 21, #9. Feb. '79, pp. 3461–3467, (D. Bishop et al.) "Character Recognition Approach Involving Histogram Classification".

Primary Examiner—Leo H. Boudreau
Assistant Examiner—Jose L. Couso
Attorney, Agent, or Firm—Milton S. Sales

[57] ABSTRACT

Thresholding and background referencing apparatus are disclosed for use with apparatus for scanning documents having images with object and background regions. The background referencing apparatus receives, from the scanning apparatus, a video signal representing the document image and generation a signal having a value representative of an estimate of the background density level of the document being scanned. The apparatus produces a difference signal representative of the difference between the estimated background level signal and the received video signal. The estimated background level signal is stored, and updated in response to (1) the difference signal being of a first sign associated with transition from object to background, and (2) only small difference signals of a second sign associated with transition from background to object, whereby large difference signals of the second sign result in substantially no change in the stored estimated background level signal.

14 Claims, 2 Drawing Sheets

BACKGROUND REFERENCING

BACKGROUND OF THE INVENTION

1. Field of the Invention

This invention relates generally to object isolation digital image processing, and more particularly, to proper referencing of the background of an image being processed.

2. Description of the Prior Art

Object isolation of images often employs image segmenation by a thresholding technique wherein the image is partitioned into a finite number of disjoint (non-overlapping) picture elements, called pixels, each of which is represented as a pure binary quantity, i.e., object or background. Thresholding is particularly useful for images containing solid area objects resting upon a contrasting background. When using a threshold rule for image segmentation of positive images, one assigns all pixels at or above the threshold density to the object. All pixels with density below threshold fall outside the object.

Thresholding works well if the object of interest has a uniform density and rests on a background of unequal but uniform density. In many cases, however, the background density is not uniform, and object contrast varies within the image. Background density variations may be caused by smudges and smears, paper textures, over-printing on documents such as checks, variations in background colors, and other defects in the image itself. Even if the background density is uniform, the video signal representing the background may be influenced by non-image effects such as variations in light source intensity and variations in the sensitivity of the image sensor. In such cases, a threshold level that works well in one area of the image might work poorly in other areas.

There are techniques, called background referencing, for generating a signal which represents an estimate of the background level, and for subsequently altering thresholding parameters in accordance with the estimated background level signal to restore satisfactory performance. Prior art background referencing techniques update the background level estimate as a function of the video signal received from the image scanner and the currently estimated background level signal.

Typically, as shown in FIGS. 1 and 2, the updating signal is derived from table lookup which responds quickly to positive difference signals between the video signal from the scanner and the estimated background level signal (the image density is below the estimated background density), and more gradually for negative difference signals. Quick response to positive difference signals permits accurate background estimate updating when the image goes from dark to light (the trailing edge of an object), as in region 10 of FIG. 2. The gradual response of the updating signal to negative difference signals permits the tracking of slow-changing backgrounds (region 12 of FIG. 2), while inhibiting the application of a large updating signal when the negative difference signal results from the sensing of an object rather than from the sensing of a slowly changing background density (region 14 of FIG. 2). However, such systems still result in the production of at least some updating signal when the difference signal is negative, and will produce an erroneous updating signal which is large enough in the case of broad objects (such as region 16 of FIG. 2), to be of concern.

SUMMARY OF THE INVENTION

It is therefore an object of the present invention to provide thresholding and background referencing which produce background level estimate-updating signals in response to sensed changes in the background density level in both positive and negative directions, but in which false updating signals are inhibited when the difference signal results from the sensing of objects.

In accordance with the present invention, background referencing apparatus is provided for use with apparatus for scanning documents having images with object and background regions. The background referencing apparatus receives, from the scanning apparatus, a video signal representing the document image and generates a signal having a value representative of an estimate of the background density level of the document being scanned. The apparatus produces a difference signal representative of the difference between the estimated background level signal and the received video signal. The estimated background level signal is stored, and updated in response to (1) the difference signal being of a first sign associated with transition from object to background, and (2) only small difference signals of a second sign associated with transition from background to object, whereby large difference signals of the second sign result in substantially no change in the stored estimated background level signal.

In accordance with a preferred embodiment of the present invention, the updating of the stored estimated background level signal is accomplished by table lookup, which produces an estimate-updating output signal based on the value of the difference signal input in accordance with a predetermined function. The updating is further accomplished by an adder for summing the estimated background level signal and the estimate-updating signal. The difference signal is produced by a subtractor, which determines the difference between the video signal and the estimated background level signal.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENT

Figure 3:
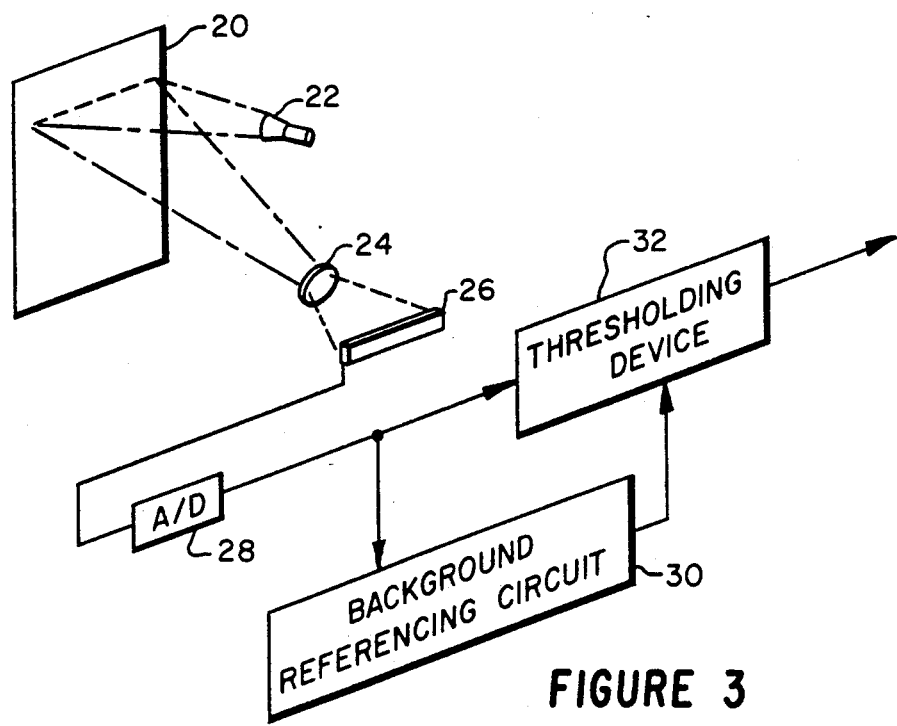
FIG. 3 shows a portion of a system for object isolation by image segmentation including a background referencing circuit in accordance with a preferred embodiment of the present invention.

Referring to FIG. 3, a document 20, bearing an image, is scanned by an optical system which includes an illumination source 22, a lens 24, and an optical sensor 26. The sensor may, for example, be a charge-coupled device linear array scanner. Conventionally, the optical system produces a series of signals such as voltage levels or pulses having a magnitude that is a function of the image optical density or intensity of reflected light received by a photodetection site on sensor 26. The series of signals are fed sequentially as a rasterized video signal representative of a plurality of pixels, each of which is quantitized into an analog signal applied to an analog-to-digital converter 28.

The digitized video signal is applied to a background referencing circuit 30 and a conventional thresholding device 32 for determining whether to treat each of the pixels as either object or background such that the output of the thresholding device is a two-level video signal which may be used for reproduction of the image of document 20, character recognition, or other purposes. The operation of thresholding device 32 is conventional, and reduces the multi-level video signal received from the image scanner to a two-level decision based on a comparison of the pixel and an updated estimate of the background level supplied by background referencing circuit 30.

Figure 4:
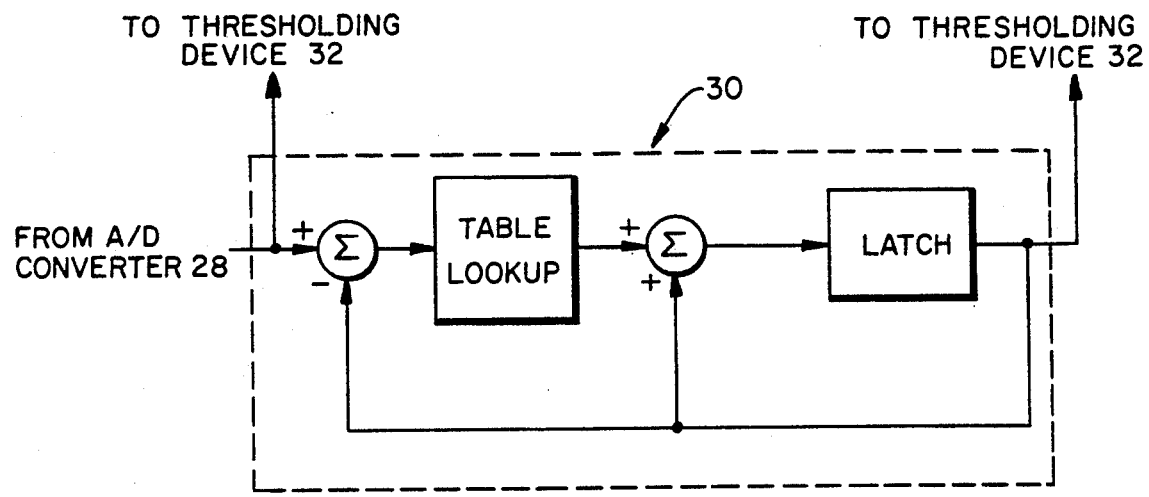
FIG. 4 shows details of the background referencing circuit of FIG. 3.

Background referencing circuit 30 is shown in greater detail in FIG. 4. The circuit produces on its output 34 a multi-level digital signal, the value of which is an estimate of the document's background level. The signal on output 34 is fed back to a subtractor 36, whereat the difference between the video signal received from the image scanner, and representing the current pixel of the document image, and the estimated background level signal produces a difference signal on line 38. The difference signal is routed to a read only memory (ROM) table lookup 40.

Table lookup 40 provides an estimate-updating signal on line 42 based on the value of the difference signal in accordance with a predetermined function, discussed in detail below. The estimate-updating signal is summed with the estimated background level signal on output 34 by an adder 44 to produce a new estimated background level signal, which is maintained on output 34 by a latch 46 until released by the next updated value from adder 44.

Figure 1:
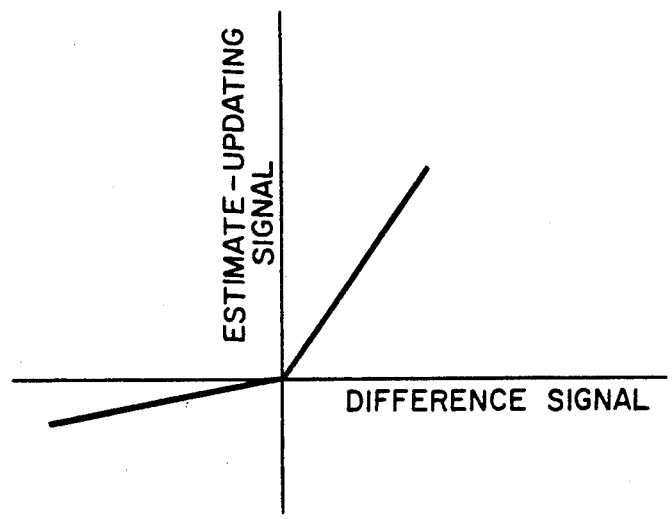
FIG. 1 is a graph showing the background level estimate updating signal generated by prior art systems in response to various differences between the video signal received from the image scanner and estimated background level signal.
Figure 5:
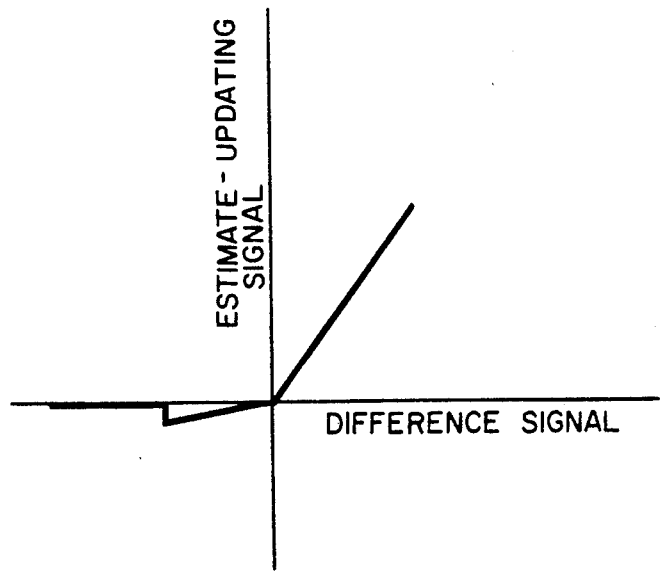
FIG. 5 is a diagram of the contents of a table lookup shown in FIG. 4.

The contents of table lookup 40 are diagrammatically shown in FIG. 5 wherein the difference signal input is plotted on the horizontal axis against the estimate-updating signal output on the vertical axis. As in the case of the prior art as depicted by FIG. 1, the estimate-updating signal will respond quickly to positive difference signals, wherein the video signal representing the current pixel of the document image is greater than the estimated background level signal. Correspondingly, the first quadrant slope of the output of table lookup 40 as a function of the difference signal is quite steep. The change in the estimate-updating signal for small negative difference signals (region 50 of FIG. 5) is more gradual, also as in the prior art.

However, for large negative difference signals, I have provided for substantially no estimate-updating signal to be generated; as depicted in region 52 of FIG. 5. Large negative difference signals are more likely to be caused by the sensor picking up the leading edge of an object than by either a change in the background level of the document or a change in the scanning system. Accordingly, the background referencing circuit of the present invention has been programmed to substantially ignore such difference signals, and the estimated background level signal remains latched at the previous level.

Figure 2:
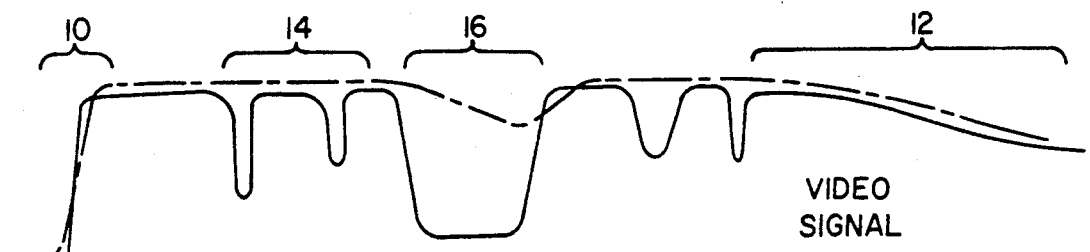
FIG. 2 is a schematic chart of a hypothetical video signal representing a document image and the estimated background level signal resulting from the prior art system of FIG. 1.

Referring back to FIG. 2, region 16 illustrates what would happen to the estimated background level signal if a large negative difference signal were permitted to affect the output of background referencing circuit for broad objects. That is, the estimated background level signal would provide a falsely low reflectivity reading. By the present invention, the difference signal generated in response to scanning the object is ignored.

In the above description, the phrase "large negative difference" has been used to mean differences of such a predetermined magnitude that the difference would be caused by the difference in the density of an object on a contrasting background. Such a magnitude cannot be defined precisely for all applications, but it is well within the abilities of a person skilled in the art to choose an appropriate magnitude for his or her specific application above which no change in the estimated background level signal is desired. Also, this disclosure has been prepared with the assumption that the document will have a positive image, wherein the objects will be darker than the background. If the system is to be used to scan negative images, an inverter in line 38 could be provided, or a table lookup used which would provide an estimate-updating signal which quickly responds to negative difference signals, slowly responds to small positive error signals, and has substantially no response to large positive difference signals.

The invention has been described in detail with particular reference to preferred embodiments thereof, but it will be understood that variations and modifications can be effected within the spirit and scope of the invention. For example, subtractor 36 may be omitted, and the digitized video signal, together with the signal on output 34, fed directly to a table lookup. The table lookup's output would be a non-linear function of its two inputs.

What is claimed is:

1. Background referencing apparatus for use with apparatus for scanning documents having images with object and background regions, wherein said background referencing apparatus (1) receives, from the scanning apparatus, a video signal having a value representing the document image, (2) generates a signal having a value representative of an estimate of a background density level of a document being scanned, and (3) further comprises:

means for storing a generated estimated background level signal; and means responsive to a generated estimated background level signal and a received video signal for producing an estimate-updating signal (1) when a received video signal changes in value in a direction associated with a transition from object to background, and (2) when a received video signal makes only a small change in value in a direction associated with transition from background to object, whereby large transitions from background to object result in substantially no change in a stored estimated background level signal.

2. Background referencing apparatus as set forth in claim 1, wherein said signal producing means comprises table lookup which produces an estimate-updating signal based on the respective values of a generated estimated background level signal and a received video signal in accordance with a predetermined function.

3. Background referencing apparatus as set forth in claim 2, further comprising updating means for summing a generated estimated background level signal and a produced estimate-updating signal.

4. Thresholding apparatus for use with apparatus for scanning documents having images with object and background regions, a background region having density level; said thresholding apparatus comprising:
means for receiving, from the scanning apparatus, a video signal representing a document image;
means for generating a signal having a value representative of an estimate of the density level of a background region of a document being scanned;
means for storing a generated estimated background level signal;
means repsonsive to a generated estimated background level signal and a received video signal for producing an estimate-updating signal (1) when a received video siganl (1) changes in value in a direction associated with a transition from object to background, and (2) when a received video signal makes only a small change in value in a direction associated with a transition from background to object, whereby large transitions from background to object result in substantially no change in the stored estimated background level signal; and
means for assigning all pixels at or above a predetermined density to one of the object or the background, and all pixels below the predetermined density to the other of the object or the background.

5. Thresholding apparatus as set forth in claim 4, wherein said signal producing means comprises table lookup which produces an estimate-updating signal based on the respective values of a generated estimated background level signal and a received video signal in accordance with a predetermined function.

6. Thresholding apparatus as set forth in claim 5, further comprising updating means for summing a generated estimated background level signal and a produced estimate-updating signal.

7. Background referencing apparatus for use with apparatus for scanning documents having images with object and background regions, wherein said background referencing apparatus (1) receives, from the scanning apparatus, a video signal having a value representing the document image, (2) generates a signal having a value representative of an estimate of a background density level of a document being scanned, and (3) further comprises:
means for producing a difference signal having a value representative of the difference between a generated estimated background level signal and a received video signal;
means for storing a generated estimated background level signal; and
means for updating a stored estimated background level signal in response to (1) said difference signal being of a first sign associated with transition from object to background, and (2) only small difference signals of a second sign associated with transition from background to object, whereby large difference signals of said second sign resulting in substantially no change in the stored estimated background level signal.

8. Background referencing apparatus as set forth in claim 7, wherein said signal producing means comprises table lookup which produces an estimate-updating output signal based on the value of the difference signal input in accordance with a predetermined function.

9. Background referencing apparatus as set forth in claim 8, wherein said signal producing means comprises an adder for summing a generated estimated background level signal and a produced estimate-updating signal.

10. Background referencing apparatus as set forth in claim 7, wherein said difference signal producing means comprises a subtractor for determining the difference between the video signal and a generated estimated background level signal.

11. Thresholding apparatus for use with apparatus for scanning documents having images with object and background regions, said thresholding apparatus comprising:
means for receiving, from the scanning apparatus, a video signal representing the document image;
means for generating a signal having a value representative of an estimate of a background density level of a document being scanned;
means for producing a difference signal representative of the difference between a generated estimated background level signal and a received video signal;
means for storing a generated estimated background level signal;
means for updating a stored estimated background level signal in response to (1) said difference signal being of a first sign associated with transition from object to background, and (2) only small difference signals of a second sign associated with transition from background to object, whereby large difference signals of said second sign resulting in substantially no change in the stored estimated background level signal; and
means for assigning all pixels at or above a predetermined density to one of the object or the background, and all pixels below the predetermined density to the other of the object or the background.

12. Thresholding apparatus as set forth in claim 11, wherein said updating means comprises table lookup which produces an estimate-updating output signal based on the value of the difference signal input in accordance with a predetermined function.

13. Thresholding apparatus as set forth in claim 12, wherein said updating means comprises an adder for summing a generated estimated background level signal and a produced estimate-updating signal.

14. Thresholding apparatus as set forth in claim 11, wherein said difference signal producing means comprises a subtractor for determining the difference between the video signal and a generated estimated background level signal.

* * * * *

UNITED STATES PATENT AND TRADEMARK OFFICE
CERTIFICATE OF CORRECTION

PATENT NO. : 5,025,480

DATED : June 18, 1991

INVENTOR(S) : Roger A. Morton et al.

It is certified that error appears in the above-identified patent and that said Letters Patent is hereby corrected as shown below:

In the Abstract (57), line 6      "generation" should be --generates--

Col. 5, line 23, Claim 4      Before "(1)" change "siganl" to --signal--

Signed and Sealed this

Twenty-fourth Day of November, 1992

Attest:

DOUGLAS B. COMER

Attesting Officer      Acting Commissioner of Patents and Trademarks

UNITED STATES PATENT OFFICE
CERTIFICATE OF CORRECTION

Patent No. 5,025,480      Dated June 18, 1991

Inventor(s) Roger A. Morton & Thomas J. Wetzel

It is certified that error appears in the above-identified patent and that said Letters Patent is hereby corrected as shown below:

Col. 6, line 7  
Claim 8                                                After "signal" change "producing" to --updating--

Col. 6, line 12  
Claim 9                                                After "signal" change "producing" to --updating--

Signed and Sealed this

Twenty-seventh Day of April, 1993

*Attest:*

MICHAEL K. KIRK

*Attesting Officer*          *Acting Commissioner of Patents and Trademarks*